(12) United States Patent
Patterson et al.

(10) Patent No.: US 9,067,466 B2
(45) Date of Patent: Jun. 30, 2015

(54) DIVERSITY ANTENNA

(71) Applicant: Bendix Commercial Vehicle Systems LLC, Elyria, OH (US)

(72) Inventors: Robert Patterson, Burnaby (CA); Kian Sheikh-Bahaie, Port Moody (CA); Shawn D. Lammers, Delta (CA)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 191 days.

(21) Appl. No.: 13/754,255

(22) Filed: Jan. 30, 2013

(65) Prior Publication Data

US 2014/0210607 A1    Jul. 31, 2014

(51) Int. Cl.
*B60C 23/00* (2006.01)
*B60C 23/04* (2006.01)
*H01Q 1/22* (2006.01)

(52) U.S. Cl.
CPC ......... *B60C 23/0415* (2013.01); *B60C 23/0437* (2013.01); *B60C 23/0444* (2013.01); *H01Q 1/2241* (2013.01)

(58) Field of Classification Search
CPC ............ B60C 23/0433; B60C 23/0415; B60C 23/0444; B60C 23/0437; B60C 23/0484; B60C 23/0406; H01Q 1/2241
USPC ................... 340/442–449; 343/700 MS, 712; 73/146, 146.3, 146.5; 116/34 R, 34 A, 116/34 B
See application file for complete search history.

(56) References Cited

U.S. PATENT DOCUMENTS

| | | | |
|---|---|---|---|
| 3,780,373 | A | 12/1973 | Holst et al. |
| 4,328,494 | A | 5/1982 | Goodall |
| 5,231,872 | A | 8/1993 | Bowler et al. |
| 5,606,732 | A | 2/1997 | Vignone, Sr. |
| 5,839,534 | A | 11/1998 | Chakraborty et al. |
| 6,034,597 | A | 3/2000 | Normann et al. |
| 6,055,855 | A | 5/2000 | Straub |
| 6,181,241 | B1 | 1/2001 | Normann et al. |
| 6,232,875 | B1 | 5/2001 | DeZorzi |
| 6,289,332 | B2 | 9/2001 | Menig et al. |
| 6,292,096 | B1 | 9/2001 | Munch et al. |
| 6,293,096 | B1 | 9/2001 | Khair et al. |
| 6,357,839 | B1 | 3/2002 | Eckert |
| 6,501,372 | B2 | 12/2002 | Lin |

(Continued)

OTHER PUBLICATIONS

Driver Instructions—Collision Warning, SmartCruise, Side Object Detection, VORAD SmartCruise System, pp. 9-11, Eaton Corporation, Feb. 2009.

(Continued)

*Primary Examiner* — Anh V La
(74) *Attorney, Agent, or Firm* — Brian E. Kondas; Eugene E. Clair; Cheryl L. Greenly

(57) ABSTRACT

An electronic component in a vehicle tire condition monitor system includes a first antenna, a second antenna, and a processor. The first antenna is oriented at an angle with respect to the second antenna. Both of the antennas are capable of receiving RF signals transmitted from a sensor associated with a respective tire of the vehicle. The RF signals represent a condition of the respective tire. The processor receives the RF signals transmitted by the sensor from at least one of the antennas. The first and second antennas receive the condition signals from any of a plurality of the sensors associated with respective tires on the vehicle.

36 Claims, 3 Drawing Sheets

(56) References Cited

U.S. PATENT DOCUMENTS

| | | |
|---|---|---|
| 6,518,875 B2 | 2/2003 | DeZorzi |
| 6,549,972 B1 | 4/2003 | Berstis et al. |
| 6,581,449 B1 | 6/2003 | Brown et al. |
| 6,603,394 B2 | 8/2003 | Raichle et al. |
| 6,775,282 B1 | 8/2004 | Vakkalagadda et al. |
| 6,788,194 B2 | 9/2004 | Yamashita |
| 6,794,993 B1 | 9/2004 | Kessler et al. |
| 6,888,934 B2 | 5/2005 | Bell |
| 6,972,671 B2 | 12/2005 | Normann et al. |
| 7,091,841 B2 | 8/2006 | Adamson et al. |
| 7,113,084 B2 | 9/2006 | Huang |
| 7,139,653 B2 | 11/2006 | Ringger et al. |
| 7,149,206 B2 | 12/2006 | Pruzan et al. |
| 7,253,784 B2 | 8/2007 | Shimura |
| 7,309,260 B2 | 12/2007 | Brower et al. |
| 7,348,878 B2 | 3/2008 | Fogelstrom |
| 7,375,699 B2 | 5/2008 | Forster et al. |
| 7,659,812 B2 | 2/2010 | Yegin et al. |
| 8,072,335 B2 * | 12/2011 | Duzdar et al. ............. 340/572.7 |
| 8,085,142 B2 * | 12/2011 | Kawase et al. ................ 340/447 |
| 2002/0105421 A1 * | 8/2002 | Lin ............................... 340/447 |
| 2003/0197603 A1 | 10/2003 | Stewart et al. |
| 2004/0155763 A1 | 8/2004 | Lin et al. |
| 2004/0178897 A1 | 9/2004 | Fennel et al. |
| 2005/0002417 A1 | 1/2005 | Kelly et al. |
| 2006/0025897 A1 | 2/2006 | Shostak et al. |
| 2007/0035452 A1 | 2/2007 | Lin et al. |
| 2007/0038346 A1 | 2/2007 | Ehrlich et al. |
| 2008/0191855 A1 | 8/2008 | Fink et al. |
| 2008/0246604 A1 | 10/2008 | McPherson et al. |
| 2009/0002146 A1 | 1/2009 | Lin |
| 2009/0224902 A1 * | 9/2009 | Watasue ....................... 340/447 |
| 2010/0148986 A1 | 6/2010 | Aunkofer et al. |
| 2010/0198427 A1 | 8/2010 | Fogelstrum et al. |
| 2010/0238012 A1 | 9/2010 | Duzdar et al. |
| 2011/0191000 A1 | 8/2011 | Grolle |

OTHER PUBLICATIONS

SmarTire by Bendix CVS, Operator's Manual, SmarTire Tire Pressure Monitoring System by Bendix CVS, BW2799, Jun. 2010.

Office Action for related U.S. Appl. No. 13/037,786, dated Jun. 20, 2013.

* cited by examiner

DIVERSITY ANTENNA

BACKGROUND

The present invention relates to monitoring conditions of a vehicle. It finds particular application in conjunction with monitoring tire conditions of a vehicle and will be described with particular reference thereto. It will be appreciated, however, that the invention is also amenable to other applications.

It is becoming more common in modern motor vehicles to monitor tire conditions (e.g., inflation pressure, temperature, etc). Maintaining the correct tire conditions helps maintain safe, efficient, and economical operation of the vehicle. Abnormal tire conditions may result in excessive tire wear, blow-outs, and poor fuel mileage.

Conventional tire condition monitoring systems typically include radio frequency (RF) sensors associated with respective tires of the vehicle. The sensors include RF transmitters that transmit intermittent signals indicating tire conditions (e.g., pressures, temperature, etc.) in the respective tires of the vehicle. Antennas placed throughout the vehicle receive the tire condition signals from the various transmitters. The antennas are electrically connected to a central electronic control unit (ECU) via electrical cables. The RF signals from the transmitters, which are received by the antennas, are transmitted from the antennas to the central ECU via the cable.

In order to improve reception from the RF transmitters, which typically rotate with the respective tires, multiple antennas are positioned on the vehicle to reliably receive the RF signals. Installing and maintaining a plurality of antennas on the vehicle increases cost and wiring complexity.

The present invention provides a new and improved apparatus and method for monitoring tire conditions on a vehicle.

SUMMARY

In one aspect of the present invention, an electronic component in a vehicle tire condition monitor system includes a first antenna, a second antenna, and a processor. The first antenna is oriented at an angle with respect to the second antenna. Both of the antennas are capable of receiving RF signals transmitted from a sensor associated with a respective tire of the vehicle. The RF signals represent a condition of the respective tire. The processor receives the RF signals transmitted by the sensor from at least one of the antennas. The first and second antennas receive the condition signals from any of a plurality of the sensors associated with respective tires on the vehicle.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
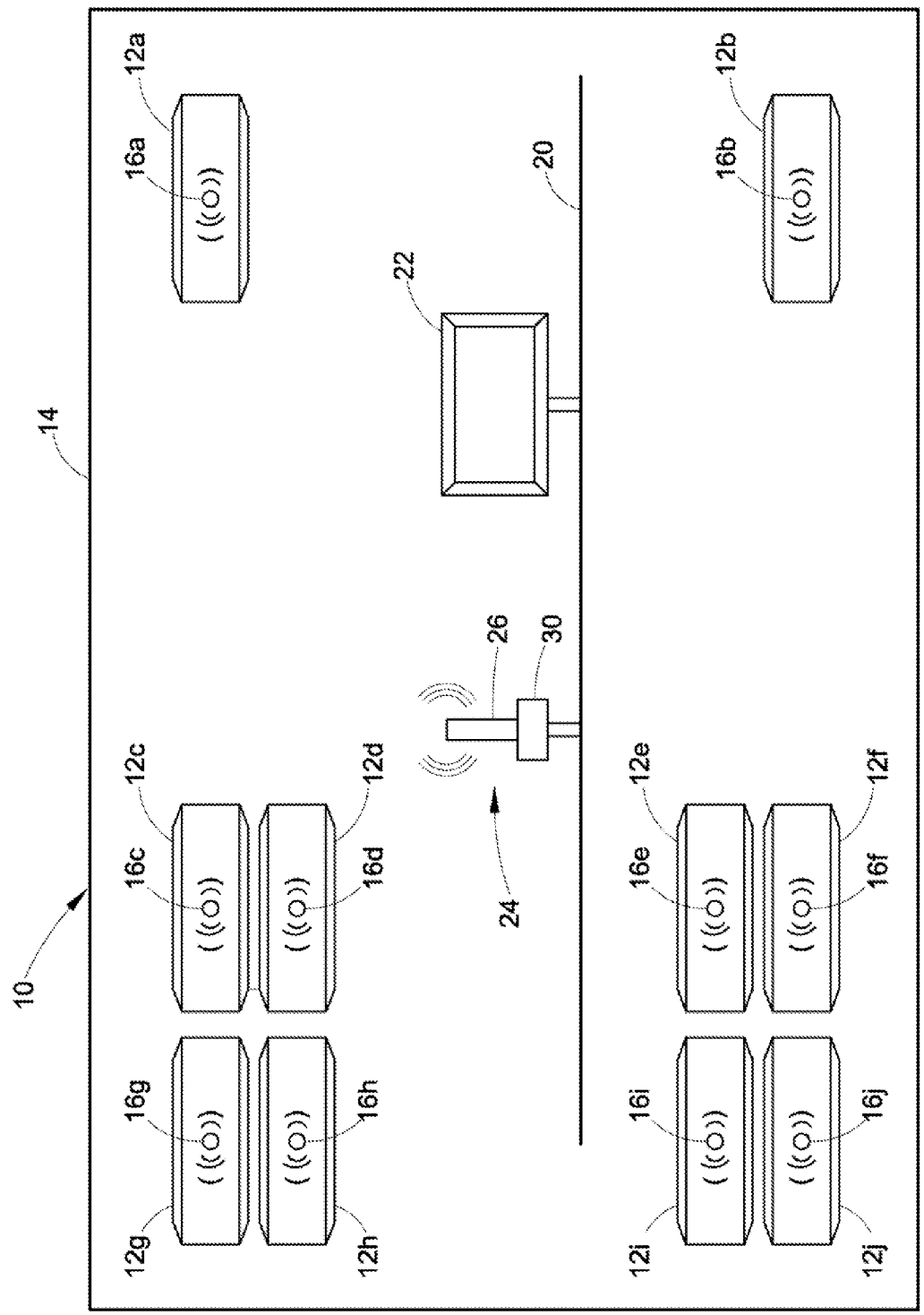
FIG. 1 illustrates a schematic representation of a vehicle including a tire condition monitoring system in accordance with one embodiment of an apparatus illustrating principles of the present invention.

With reference to FIG. 1, a simplified component diagram is illustrated, in accordance with one embodiment of the present invention, of an exemplary system 10 for monitoring various conditions (e.g., pressure, temperature, rotation/speed, vibration, wear, and/or load, etc.) of tires 12a, 12b, 12c, 12d, 12e, 12f, 12g, 12h, 12i, 12j on a vehicle 14. In one embodiment, the vehicle 14 is a heavy-vehicle (e.g., a truck or bus) and has tires inflated with a fluid (e.g., air, pure nitrogen, etc).

Sensors 16a, 16b, 16c, 16d, 16e, 16f, 16g, 16h, 16i, 16j are associated with the respective tires 12a, 12b, 12c, 12d, 12e, 12f, 12g, 12h, 12i, 12j. In one embodiment, the sensors 16a, 16b, 16c, 16d, 16e, 16f, 16g, 16h, 16i, 16j are in-tire sensors. In a step 100, it is also contemplated that one or more of the sensors 16a, 16b, 16c, 16d, 16e, 16f, 16g, 16h, 16i, 16j transmit radio-frequency (RF) signals based on (e.g., representing) at least one of the conditions of the respective tires 12a, 12b, 12c, 12d, 12e, 12f, 12g, 12h, 12i, 12j. In one embodiment, it is contemplated that the RF signals include a sensor identifier tag identifying the respective sensor 16a, 16b, 16c, 16d, 16e, 16f, 16g, 16h, 16i, 16j that generated the signal, a pressure condition, and a temperature condition. The respective tire 12a, 12b, 12c, 12d, 12e, 12f, 12g, 12h, 12i, 12j for which the conditions (e.g., pressure, temperature, etc.) apply is determined as a function of the sensor identifier tag.

The vehicle 14 includes a vehicle communication bus 20. In one embodiment, the communication bus 20 is a standard protocol communication bus (e.g., a serial data bus such as a J1939 standards protocol communication bus or a local interconnect network (LIN)). However, other types of communication buses are also contemplated.

A vehicle electronic control unit (ECU) 22 communicates with the communication bus 20. It is contemplated that the ECU 22 transmits and receives messages to/from the communication bus 20. For example, the vehicle ECU 22 transmits and receives messages formatted according to the J31939 standard protocol. It is assumed, for purposes of discussion, that the vehicle ECU 22 is an antilock braking system ECU. However, it is to be understood that any other vehicle ECU may also be used for monitoring one of more of the conditions of the tires 12a, 12b, 12c, 12d, 12e, 12f, 12g, 12h, 12i, 12j.

An electronic component 24 also communicates with the communication bus 20. It is contemplated that the electronic component 24 transmits and receives messages to/from the communication bus 20 according to the same format (e.g., the J1939 standard protocol) as the standard protocol. The messages transmitted by and received from the electronic component 24 may be "public" and/or "private" messages. For example, the bus 20 is capable of transmitting messages formatted according to the SAE J1939 standard and, in addition, messages formatted according to other standards (e.g., proprietary standards). Messages formatted according to the SAE J1939 standard are "public" messages, if, for example, controllers from many different manufacturers are designed to interpret the messages. Messages formatted according to proprietary standards are referred to as "private" messages if, for example, only vehicle controllers manufactured by a particular manufacturer are designed to interpret the messages.

In the illustrated embodiment, the electronic component 24 includes an antenna 26 and a processing device 30 (e.g., a microcontroller).

Figure 2:
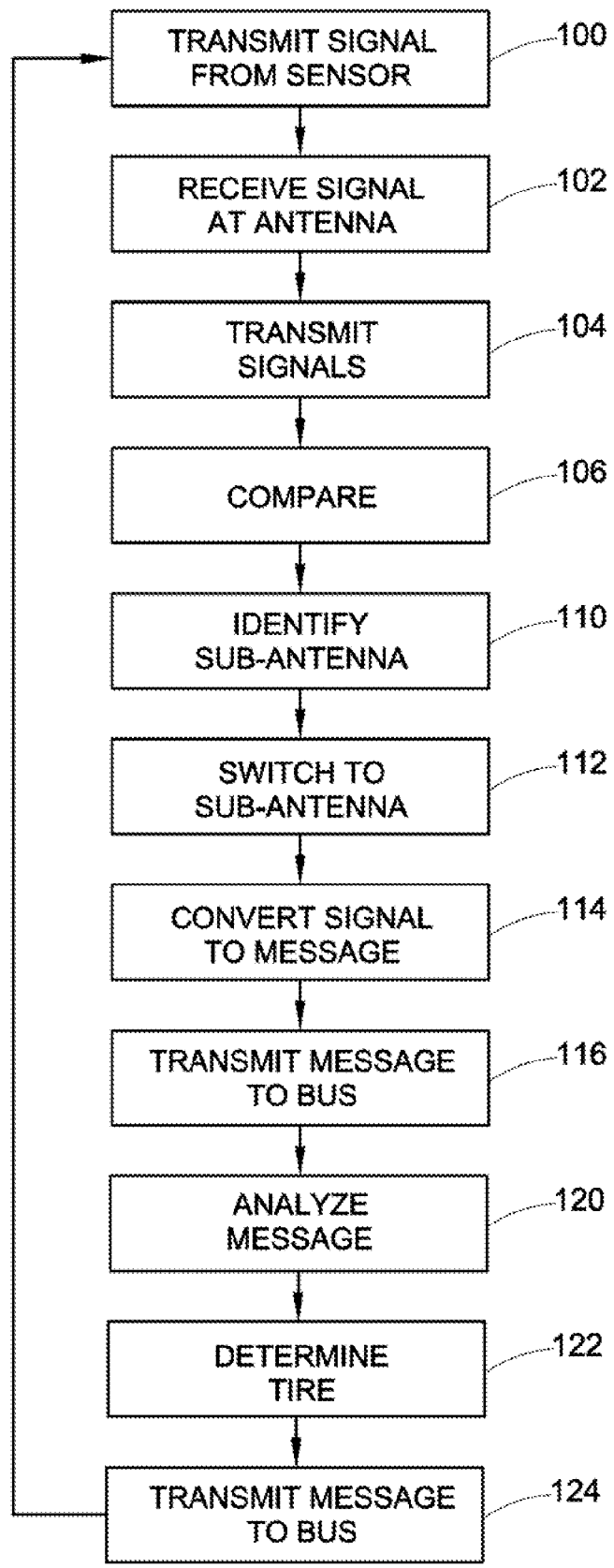
FIG. 2 is an exemplary methodology of monitoring tire conditions in a vehicle in accordance with one embodiment illustrating principles of the present invention.
Figure 3:
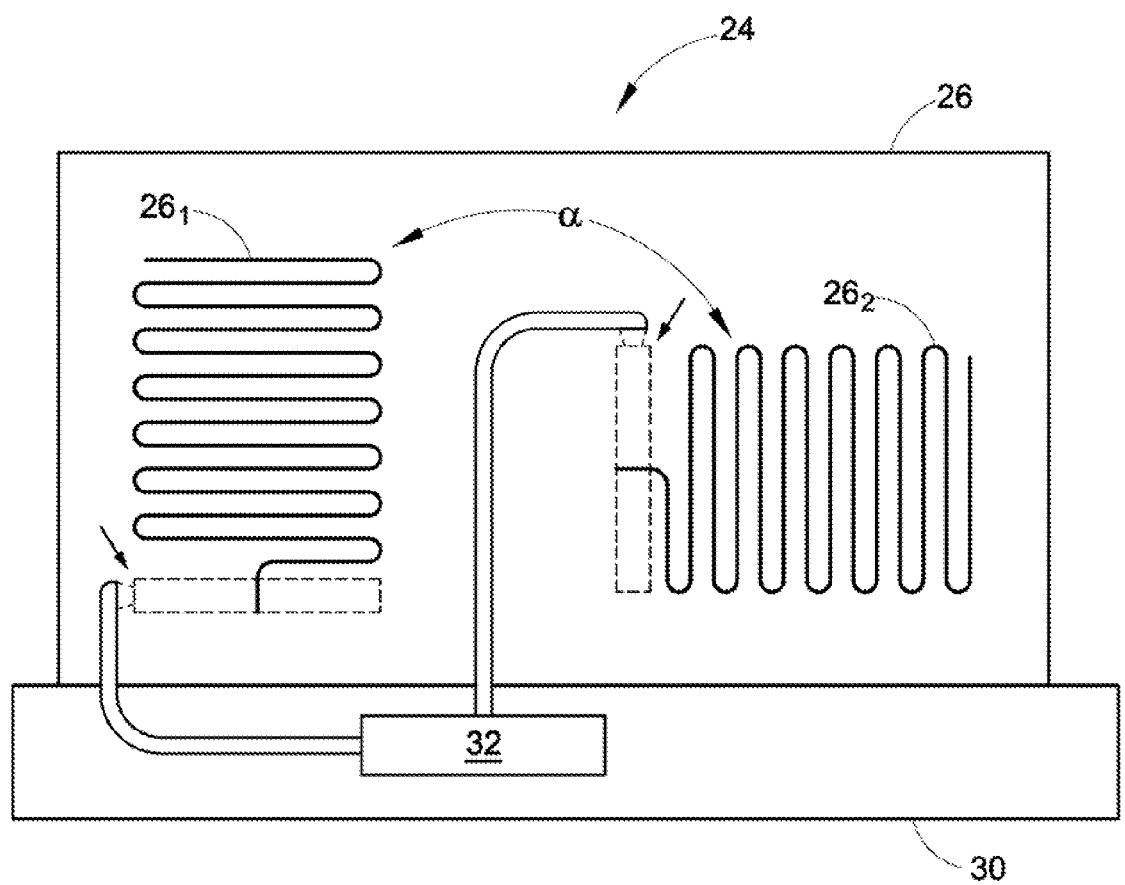
FIG. 3 illustrates a schematic representation of an electronic component including a plurality of antennas in accordance with one embodiment of an apparatus illustrating principles of the present invention.

With reference to FIGS. 1-3, the antenna 26 is contemplated to be a diversity antenna. As illustrated, the diversity antenna 26 actually includes a plurality (e.g., two (2)) of antennas $26_1$, $26_2$ (e.g., a first antenna $26_1$ and a second antenna $26_2$), which are capable of receiving RF signals from the sensors 16a, 16b, 16c, 16d, 16e, 16f, 16g, 16h, 16i, 16j. Because the first and second antennas $26_1$, $26_2$ are part of the antenna 26, the antennas $26_1$, $26_2$ are also referred to as first and second sub-antennas, respectively, while the antenna 26 is referred to as the diversity antenna or an antenna package. For example, the diversity antenna 26 illustrated in FIG. 3 includes two (2) sub-antennas $26_1$, $26_2$ (e.g., the first sub-antenna $26_1$ and the second sub-antenna $26_2$). Each of the sub-antennas $26_1$, $26_2$ is independently electrically connected to the processing device 30 via circuitry 32 in the processing device 30. In that regard, the sub-antennas $26_1$, $26_2$ are not directly electrically connected to each other but, instead, are only indirectly electrically connected to each other via the circuitry 32. In one embodiment, the first sub-antenna $26_1$ is oriented at an angle α relative to the second sub-antenna $26_1$. The angle α between the first and second sub-antennas $26_1$, $26_2$ is referred to as angle diversity or polarization. The angle α is contemplated to be any angle greater than about 45° and less than about 135°, and in one embodiment is about 90°.

For ease of illustration, the first and second sub-antennas $26_1$, $26_2$ are illustrated next to each other. However it is contemplated that a face of the first sub-antenna $26_1$ is in front of (e.g., faces) a face of the second sub-antenna $26_2$.

Because of the different orientations, each of the sub-antennas $26_1$, $26_2$ has different sensitivity to RF signals from different directions. Therefore, the angle diversity or polarization can result in a reduction of the total number of antennas on a vehicle. In the illustrated embodiment, only a single antenna 26 is used for the entire vehicle 14, which reduces cost and complexity while improving reliability. In general, diversity antennas allow for more circular polarizations and reduce the chance of multipath reflections. In the embodiment illustrated in FIG. 3, the diversity antenna 26 is a microstrip meander line diversity antenna printed directly on a circuit board. By combining both of the sub-antennas $26_1$, $26_2$ into the antenna package 26, a more uniform circular radiation pattern may be observed by the antenna package 26, which acts to reduce any nulls in the reception and multipath effects in the received signal.

Because of the different orientations of the sub-antennas $26_1$, $26_2$, the RF signals generated by the sensors 16a, 16b, 16c, 16d, 16e, 16f, 16g, 16h, 16i, 16j may repeatedly become stronger and then weaker as sensed by the one or the other of the sub-antennas $26_1$, $26_2$ as the tires 12a, 12b, 12c, 12d, 12e, 12f, 12g, 12h, 12i, 12j rotate. For example, as the tires 12a, 12b, 12c, 12d, 12e, 12f, 12g, 12h, 12i, 12j rotate, different ones of the sensors 16a, 16b, 16c, 16d, 16e, 16f, 16g, 16h, 16i, 16j may become closer to, or farther from, either the first sub-antenna $26_1$ or the second sub-antenna $26_2$. In addition, RF signals generated by the sensors 16a, 16b, 16c, 16d, 16e, 16f, 16g, 16h, 16i, 16j may be attenuated and/or distorted by, for example, metal sidewalls, metal rims, etc. associated with the rotating tires 12a, 12b, 12c, 12d, 12e, 12f, 12g, 12h, 12i, 12j.

The circuitry 32 in the processing device 30 switches between the sub-antennas $26_1$, $26_2$, senses the respective signals from the sub-antennas $26_1$, $26_2$ and determines which of the sub-antennas $26_1$, $26_2$ is providing a more desirable (e.g., better) signal (e.g., a signal that is stronger, clearer, more powerful, etc). Therefore, the circuitry 32 acts as a means for identifying which one of the sub-antennas $26_1$, $26_2$ is passing the RF signal more desirably to the processor 30. The circuitry 32 selects (e.g., switches) the processing device 30 to the one of the plurality of sub-antennas $26_1$, $26_2$ providing the more desirable signal. Since the embodiment illustrated in FIG. 3 only includes two (2) sub-antennas $26_1$, $26_2$, the circuitry 32 "switches" the processing device 30 to the one of the two (2) sub-antennas $26_1$, $26_2$ providing the more desirable signal. Switching the processing device 30 to one of the sub-antennas $26_1$, $26_2$ involves electrically transmitting (e.g., passing) the signal received by a selected one of the sub-antennas $26_1$, $26_2$ to the communication bus 20.

If the antenna package 26 includes more than two (2) sub-antennas $26_1$, $26_2$, the circuitry 32 switches between all of the sub-antennas, senses the signals from all of the sub-antennas and determines which one of the plurality of the sub-antennas is providing the most desirable signal. The circuitry 32 then "switches" the processing device 30 to the one of the plurality of sub-antennas providing the most desirable signal. For example, the processing device 30 attempts to sense a signal on the first sub-antenna $26_1$, and then switches to attempt to sense a signal on the second sub-antenna $26_2$. If the signal strength is lower (e.g., even no signal) on the second sub-antenna $26_2$ than it was on the first sub-antenna $26_1$, then the processing device 30 switches back to the first sub-antenna $26_1$ for the remainder of the sensor data transmission. In one example, there are ten (10) packets of data per transmission. The processing device 30 switches for each data packet as the rotation of the respective tire 12a, 12b, 12c, 12d, 12e, 12f, 12g, 12h, 12i, 12j affects the signal transmission during the data packet transmission. The respective sensor 16a, 16b, 16c, 16d, 16e, 16f, 16g, 16h, 16i, 16j transmits one transmission every three (3) to five (5) minutes, but the sensor data transmission rate is greater than about 1 kbaud, averaging about 3 kbaud.

The processing device 30 acts as a single monitoring device. As discussed above, since the antenna 26 is a diversity antenna, the necessity for additional antennas (e.g., at each wheel end) is greatly reduce or even eliminated. In the illustrated embodiment, the processor 30 acts as a single conduit for the signals from any of the plurality of sensors associated with respective tires on the vehicle. The sub-antennas $26_1$, $26_2$ receive various RF signals from the various sensors 16a, 16b, 16c, 16d, 16e, 16f, 16g, 16h, 16i, 16j. The circuitry 32 included in the processing device 30 identifies which of the sensors 16a, 16b, 16c, 16d, 16e, 16f, 16g, 16h, 16i, 16j generated the signal based on the sensor identifier tag included in the signal.

With reference again to FIGS. 1-3, in a step 102, the antenna 26 alternately receives the RF signals transmitted from one or more of the sensors 16a, 16b, 16c, 16d, 16e, 16f, 16g, 16h, 16i, 16j. More specifically, one or both of the sub-antennas $26_1$, $26_2$ receives the RF signals transmitted from one or more of the sensors 16a, 16b, 16c, 16d, 16e, 16f, 16g, 16h, 16i, 16j. The circuitry 32 in the processing device 30 switches the processing device 30 between the sub-antennas $26_1$, $26_2$. In the illustrated embodiment, the signals are transmitted wirelessly as RF signals from the sensors 16a, 16b, 16c, 16d, 16e, 16f, 16g, 16h, 16i, 16j to the at least one sub-antenna $26_1$, $26_2$ (which reduces the necessity of cabling between the sensors and the antenna). As discussed above, the RF signals received by the at least one sub-antenna $26_1$, $26_2$ are based on the pressures, temperatures, and/or other various conditions of the respective tires 12a, 12b, 12c, 12d, 12e, 12f, 12g, 12h, 12i, 12j.

In a step 104, the RF signals are transmitted from the antenna 26 to the processing device 30 of the electronic component 24. More specifically, in the step 104, the RF signals are transmitted from each of the sub-antennas $26_1$, $26_2$ to the processing device 30 of the electronic component 24.

The processing device 30 may be configured to always be "listening" for signals from the antenna 26. In one embodiment, it is contemplated that the processing device 30 is powered by the vehicle battery voltage. The processing device 30 requires significantly less power than the ECU 22 and will limit drain on the vehicle battery. In this case, the processing device 30 may be listening for signals even when the vehicle's engine is not running. Then, once the ignition is turned-on, the processing device 30 may transmit the data to the ECU 22. Such a design allows for a warning of out-of-range tire pressure shortly after the vehicle 14 is started. In another embodiment, the processing device 30 may be powered directly from a central computer or from the ECU 22. This design allows for low voltage power to be applied to the processing device 30. In addition, this design may provide for lower costs since there is reduced circuit protection and less complexity. However, the processing device 30 may not be able to receive signals when the vehicle ignition is off.

In one embodiment, the sensor identifier tag information and/or a sensor identification code is/are embedded in the message along with the tire condition information from the respective sensor 16a, 16b, 16c, 16d, 16e, 16f, 16g, 16h, 16i, 16j that transmitted the signal. In a step 106, the circuitry 32 of the processing device 30 compares a signal received from one of the sub-antennas $26_1$, $26_2$ for a particular one of the sensors 16a, 16b, 16c, 16d, 16e, 16f, 16g, 16h, 16i, 16j with a signal received from the other of the sub-antennas $26_1$, $26_2$ for the same particular sensor 16a, 16b, 16c, 16d, 16e, 16f, 16g, 16h, 16i, 16j. In a step 110, the circuitry 32 of the processing device 30 identifies, based on the comparison of the step 106, which of the sub-antennas $26_1$, $26_2$ provided a more desirable signal (e.g., stronger, clearer, etc.) for the particular one of the sensors 16a, 16b, 16c, 16d, 16e, 16f, 16g, 16h, 16i, 16j. Then, in a step 112, the circuitry 32 switches the processing device 30 to the sub-antenna $26_1$, $26_2$ that provided the more desirable signal. In other words, the circuitry 32 (e.g., the processing device 30) selects the sub-antenna $26_1$, $26_2$ that provided the better signal (e.g., the sub-antenna $26_1$, $26_2$ that provided the higher signal strength, higher power, and/or higher voltage). Once the processing device 30 is switched to the sub-antenna $26_1$, $26_2$ that provided the more desirable signal, the processing device 30 converts the RF signals from the selected sub-antenna $26_1$, $26_2$, which represent the "raw" data based on the tire conditions, to a respective message formatted for the communication bus 20 in a step 114. As discussed above, it is contemplated that the message is either a "public" message or a "private" message formatted according to the J1939 standard protocol.

In a step 116, the processing device 30 transmits the message from the selected sub-antenna $26_1$, $26_2$ to the communication bus 20. In one embodiment, the processing device 30 transmits the message from the selected sub-antenna $26_1$, $26_2$ to the vehicle ECU 22 via the communication bus 20.

Upon receiving one of the messages from the processing device 30, the vehicle ECU 22 analyzes the message in a step 120 and then, in a step 122, determines, based on the identifier tag information in the message, which one of the tires 12a, 12b, 12c, 12d, 12e, 12f, 12g, 12h, 12i, 12j the condition information relates to. For example, the vehicle ECU 22 determines, based on the identifier tag information in the message, which one of the sensors 16a, 16b, 16c, 16d, 16e, 16f, 16g, 16h, 16i, 16j transmitted the message. The message is transmitted, in a step 124, from the ECU 22 to the bus 20.

In one embodiment, the vehicle ECU 22 transmits the message, in the step 124, with pressure and temperature identified in standard units along with the appropriate location identifiers so that the message may be interpreted by other systems on the vehicle 14. The process then returns to the step 100.

It is contemplated that the sensors 16a, 16b, 16c, 16d, 16e, 16f, 16g, 16h, 16i, 16j transmit the signals, based on the respective tire 12a, 12b, 12c, 12d, 12e, 12f, 12g, 12h, 12i, 12j conditions, at relatively infrequent intervals. For example, in one embodiment, the sensors transmit the respective signals between about every 1 minute and about every 15 minutes (e.g., between about every 3 minutes and about every 5 minutes). Such infrequent transmissions provide the processing device 30 the time required for converting the RF signals to the J1939 messages and transmitting those messages along the relatively slower serial communication bus 20. Therefore, neither the bus 20 nor the vehicle ECU 22 is overwhelmed by messages from the sensors 16a, 16b, 16c, 16d, 16e, 16f, 16g, 16h, 16i, 16j. In contrast, other RF applications, such as telematics and radar systems, typically are constantly transmitting information to the bus 20. Sufficient time would not be available to the processing device 30 for performing the conversions if the sensors were transmitting the data signals at increased frequencies. In addition, the relatively infrequent transmissions help to limit the amount of data transmitted between the sensors 16a, 16b, 16c, 16d, 16e, 16f, 16g, 16h, 16i, 16j and the vehicle ECU 22 via the vehicle communication bus 20.

It is contemplated that the processing device 30 is capable of processing (e.g., sampling) the signals from the sensors 16a, 16b, 16c, 16d, 16e, 16f, 16g, 16h, 16i, 16j by, for example, switching between the sub-antennas $26_1$, $26_2$, at a sampling rate greater than the rate at which the sensors transmit the respective signals (e.g., a sensor data rate). For example, the sampling rate of the signals from the sensors 16a, 16b, 16c, 16d, 16e, 16f, 16g, 16h, 16i, 16j is about double the sensor date rate. In the example described above, the processing device 30 would be capable of processing (e.g., sampling) the signals from the sensors 16a, 16b, 16c, 16d, 16e, 16f, 16g, 16h, 16i, 16j at a rate greater than about every 1 minute to about every 15 minutes.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An electronic component in a vehicle tire condition monitor system, the electronic component comprising:
   a first antenna and a second antenna, the first antenna oriented at an angle between about 45° and about 135° with respect to the second antenna, both of the antennas being capable of receiving RF signals transmitted from a plurality of sensors associated and rotating with respective tires of the vehicle, the RF signals from each of the sensors representing a condition of the respective associated tire, and the angle of orientation of the first antenna with respect to the second antenna enabling at least one of the antennas to receive the RF signals from each of the sensors independent of a rotational position of the sensor; and a processor receiving the RF signals from at least one of the antennas.

2. The electronic component in a vehicle tire condition monitor system as set forth in claim 1, wherein:

the processor converts the RF signals from only one of the antennas to a message; and the processor transmits the message to an electronic control unit via a vehicle communication bus.

3. The electronic component in a vehicle tire condition monitor system as set forth in claim 1, wherein:

the processor switches between the first antenna and the second antenna while the RF signals are transmitted from the sensor; and the processor switches to and selects the one of the first antenna and the second antenna having a greater signal strength detected by the processor while the RF signals are transmitted from the sensor.

4. The electronic component in a vehicle tire condition monitor system as set forth in claim 3, wherein:

the sensor transmits 10 data packets at about a sensor data rate of about 3 kbaud; and the processor maintains the selection of the antenna until the completion of 1 of the data packets.

5. The electronic component in a vehicle tire condition monitor system as set forth in claim 1, wherein:

the angle is about 90°.

6. The electronic component in a vehicle tire condition monitor system as set forth in claim 1, wherein:

the first antenna and the second antenna are included in an antenna package.

7. The electronic component in a vehicle tire condition monitor system as set forth in claim 1, wherein:

a sampling rate of the switching between the first and second antennas by the processor is greater than a sensor data rate at which the sensors transmit the RF signals.

8. The electronic component in a vehicle tire condition monitor system as set forth in claim 7, wherein:

the sampling rate of the switching between the first and second antennas by the processor is about double the sensor data rate.

9. The electronic component in a vehicle tire condition monitor system as set forth in claim 7, wherein:

the rate at which the sensors transmit the RF signals is between about every 1 minute and about every 15 minutes.

10. The electronic component in a vehicle tire condition monitor system as set forth in claim 1, wherein:

the first antenna is only indirectly electrically connected to the second antenna via the processor.

11. The electronic component in a vehicle tire condition monitor system as set forth in claim 1, wherein:

the processor determines which one of the antennas provides a signal having higher power.

12. The electronic component in a vehicle tire condition monitor system as set forth in claim 11, wherein:

the processor compares the RF signals from the first and second antennas to determine the one of the antennas that provides the more desirable signal.

13. The electronic component in a vehicle tire condition monitor system as set forth in claim 11, wherein:

the processor converts the RF signals from the one of the antennas that provides the more desirable signal to the message.

14. A system for monitoring a condition in vehicle tires, the system comprising:

a vehicle communication bus;

an electronic control unit communicating with the vehicle communication bus;

a plurality of tires on the vehicle;

a plurality of sensors associated and rotating with the respective tires, the sensors transmitting respective RF signals based on respective conditions of the respective tires; and an electronic component communicating with the vehicle communication bus, the electronic component including:

a first antenna and a second antenna, the first antenna oriented at an angle between about 45° and about 135° with respect to the second antenna, both of the antennas being capable of receiving RF signals transmitted from the sensors, and the angle of orientation of the first antenna with respect to the second antenna enabling at least one of the antennas to receive the RF signals from each of the sensors independent of a rotational position of the sensor; and a processor receiving the RF signals from at least one of the antennas and identifying the sensor that generated the RF signals.

15. The system monitoring a condition in vehicle tires as set forth in claim 14, wherein:

the processor converts the RF signals for the identified sensor from only one of the antennas to a message; and the processor transmits the message to an electronic control unit Via the vehicle communication bus.

16. The system for monitoring a condition in vehicle tires as set forth in claim 14, wherein:

the angle is about 90°.

17. The system for monitoring a condition in vehicle tires as set forth in claim 16, wherein:

the first antenna of the diversity antenna is only indirectly electrically connected to the second antenna via the processor.

18. The system for monitoring a condition in vehicle tires as set forth in claim 14, wherein:

the processor determines which one of the antennas provides signal having a higher power; and the processor converts the RF signals from the one of the antennas that provides the signal having the higher power.

19. The system for monitoring a condition in vehicle tires as set forth in claim 14, wherein:

if the processor receives the RF signals transmitted by the sensor from only one of the antennas, the processor converts the RF signals from the one of the antennas.

20. A method tier monitoring, a condition in vehicle tires, the method comprising:

transmitting an RF signal from a sensor associated with one of the tires on the vehicle, the RF signal indicating a condition of the tire;

alternately receiving the RF signal by a first antenna and a second antenna, the first antenna oriented at an angle between about 45° and about 135° with respect to the second antenna enabling at least one of the antennas to receive the RF signals from the sensor independent of a rotational position of the sensor;

identifying which of the first antenna and the second antenna is passing a stronger of the RF signals to a processor; and switching the processor to the one of the first and second antennas passing the Stronger RF signal.

21. The method for monitoring a condition in vehicle tires as set forth in claim 20, further including:
converting the stronger RF signal from the identified one of the first and second antennas to a message; and
passing the message to a vehicle communication bus.

22. The method for monitoring a condition in vehicle tires as set forth in claim 20, further including:
switching the processor to receive the more desirable signal.

23. The method for monitoring a condition in vehicle tires as set forth in claim 20, wherein:
the step of transmitting the RF signal from the sensor occurs at a slower rate than the step of alternately receiving the RF signal by the first and second antennas.

24. The method for monitoring a condition in vehicle tires as set forth in claim 23, wherein:
the step of transmitting the RF signal from the sensor occurs at about 3 kbaud.

25. The method for monitoring a condition in vehicle tires as set forth in claim 20, wherein if only one of the first and second antennas receives the RF signal, the identifying step includes:
identifying the one of the first antenna and the second antenna that received the stronger RF signal.

26. An electronic component in a vehicle tire condition monitor system, the electronic component comprising:
a first antenna and a second antenna, the first antenna oriented at an angle between about 45° and about 135° with respect to the second antenna, both of the antennas being capable of receiving RF signals transmitted from a plurality of sensors associated and rotating with respective tires of the vehicle, the RF signals representing respective conditions of the tire, and the angle of orientation of the first antenna with respect to the second antenna enabling at least one of the antennas to receive the RF signals from each of the sensors independent of a rotational position of the sensor;
a processor; and
means for identifying which one of the first antenna and the second antenna is passing the RF signal more desirably to the processor.

27. The electronic component in a vehicle tire condition monitor system as set forth in claim 26, wherein:
the processor converts the RF signals from the one of the antennas to a message; and
the processor transmits the message to an electronic control unit via a vehicle communication bus.

28. The electronic component in a vehicle tire condition monitor system as set forth in claim 26, wherein:
the means for identifying includes circuitry in the processor.

29. The electronic component in a vehicle tire condition monitor system as set forth in claim 28, wherein:
the means for identifying compares the respective RF signals received by the first and second antennas; and
based on the comparison, the means for identifying selects the one of the antennas.

30. The electronic component in a vehicle tire condition monitor system as set forth in claim 26, wherein:
the angle is about 90°.

31. An electronic component in a vehicle tire condition monitor system, the electronic component comprising:
a first antenna and a second antenna, the first antenna oriented at an angle between about 45° and about 135° with respect to the second antenna, both of the antennas being capable of receiving RF signals transmitted from a sensor associated and rotating with a respective tire of the vehicle, the RF signals representing a condition of the respective tire, and the angle of orientation of the first antenna with respect to the second antenna enabling at least one of the antennas to receive the RF signals from the sensor independent of a rotational position of the sensor; and
a processor, receiving the RF signals transmitted by the sensor from at least one of the antennas, for identifying one of the antennas as delivering a stronger signal, the first and second antennas receiving the condition signals from any of a plurality of the sensors associated with respective tires on the vehicle.

32. The electronic component in a vehicle tire condition monitor system as set forth in claim 31, wherein:
the processor converts the RF signals from the identified antenna to a message; and
the processor transmits the message to an electronic control unit via a vehicle communication bus.

33. The electronic component in a vehicle tire condition monitor system as set forth in claim 31, wherein:
the angle about 90°.

34. The electronic component in a vehicle tire condition monitor system as set forth in claim 31, wherein:
the first antenna is only indirectly electrically connected to the second antenna via the processor.

35. The electronic component in a vehicle tire condition monitor system as set forth in claim 31, wherein:
the first and second antennas are first and second sub-antennas, respectively, included in an antenna package.

36. The electronic component in a vehicle tire condition monitor system as set forth in claim 31, wherein:
if the processor receives the RF signals transmitted from only one of the antennas, the processor identities the one of the antennas as providing the stronger signal.

* * * * *